US012314480B2

(12) United States Patent
Kuji (10) Patent No.: US 12,314,480 B2
(45) Date of Patent: May 27, 2025

(54) INFORMATION PROCESSING APPARATUS, INFORMATION PROCESSING METHOD, AND PROGRAM (71) Applicant: Sony Interactive Entertainment Inc., Tokyo (JP)

(72) Inventor: Takuya Kuji, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/682,198

(22) PCT Filed: Aug. 12, 2022

(86) PCT No.: PCT/JP2022/030768
§ 371 (c)(1),
(2) Date: Feb. 8, 2024

(87) PCT Pub. No.: WO2023/022109
PCT Pub. Date: Feb. 23, 2023

(65) Prior Publication Data
US 2024/0220027 A1 Jul. 4, 2024

(30) Foreign Application Priority Data
Aug. 17, 2021 (JP) ................. 2021-132517

(51) Int. Cl.
*G06F 3/01* (2006.01)
*G06F 3/0346* (2013.01)

(52) U.S. Cl.
CPC .............. *G06F 3/017* (2013.01); *G06F 3/013* (2013.01); *G06F 3/0346* (2013.01); *G06F 3/012* (2013.01)

(58) Field of Classification Search
CPC ........ G06F 3/017; G06F 3/013; G06F 3/0346; G06F 3/012; G06F 3/011; G06F 3/014; G06F 3/01; A63F 13/25; A63F 13/426; A63F 13/428; A63F 13/55
See application file for complete search history.

(56) References Cited

U.S. PATENT DOCUMENTS

| 10,636,212 | B2 | 4/2020 | Tamaoki |
| 11,209,900 | B2 | 12/2021 | Saito et al. |
| 2017/0076503 | A1 | 3/2017 | Tamaoki |
| 2018/0059788 | A1* | 3/2018 | Noguchi ................. G06F 3/012 |

(Continued)

FOREIGN PATENT DOCUMENTS

| JP | 2017058971 A | 3/2017 |
| JP | 2018032132 A | 3/2018 |

(Continued)

OTHER PUBLICATIONS

International Search Report for corresponding PCT Application No. PCT/JP2022/030768, 4 pages, dated Sep. 13, 2022.

*Primary Examiner* — Premal R Patel
(74) *Attorney, Agent, or Firm* — Kilpatrick Townsend & Stockton LLP (57) ABSTRACT An information processing apparatus is provided which identifies a state of a line of sight of a user, identifies a state of a hand and fingers of the user, and controls a hand object representing the hand of the user in a virtual space, in a manner linked with the state of the hand and fingers of the user. A state of the hand object is controlled according to the state of the line of sight of the user.

6 Claims, 5 Drawing Sheets (56) References Cited

U.S. PATENT DOCUMENTS

2021/0342003 A1 11/2021 Kuji
2022/0084279 A1* 3/2022 Lindmeier .............. G06F 3/012

FOREIGN PATENT DOCUMENTS

| JP | 2019032844 A | 2/2019 |
| WO | 2018186031 A1 | 10/2018 |
| WO | 2020079852 A1 | 4/2020 |

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program for placing an object representing a user's hand in a virtual space.

BACKGROUND ART

In video games in which a user performs various activities in a virtual space, the state of the user's real fingers may be recognized, and this state may be reflected in an object representing the user's hand in the virtual space. This allows the user to carry out finger motions naturally such as gripping an object and playing rock-paper-scissors in the virtual space.

SUMMARY

Technical Problem

Given the existing technology above, there may be cases where the state of the user's every finger may not be able to be recognized correctly due to hardware constraints or issues with the accuracy of recognition. In such cases, the user may not be able to have his or her intention fully reflected in the object in the virtual space and may thus experience feelings of discomfort.

The present invention has been made in view of the above circumstances and provides as an object an information processing apparatus, an information processing method, and a program for allowing a user's intention to be reflected in an object that represents the user's hand.

Solution to Problem

According to one mode of the present invention, there is provided an information processing apparatus including a line-of-sight state identification part configured to identify a state of a line of sight of a user, a hand-finger state identification part configured to identify a state of a hand and fingers of the user, and a user-hand object control part configured to control a hand object representing the hand of the user in a virtual space, in a manner linked with the state of the hand and fingers of the user, in which the user-hand object control part controls a state of the hand object according to the state of the line of sight of the user.

According to another mode of the present invention, there is provided an information processing method including a step of identifying a state of a line of sight of a user, a step of identifying a state of a hand and fingers of the user, and a step of controlling a hand object representing the hand of the user in a virtual space, in a manner linked with the state of the hand and fingers of the user, in which the step of controlling the hand object includes controlling a state of the hand object according to the state of the line of sight of the user.

According to a further mode of the present invention, there is provided a program for causing a computer to perform a step of identifying a state of a line of sight of a user, a step of identifying a state of a hand and fingers of the user, and a step of controlling a hand object representing the hand of the user in a virtual space, in a manner linked with the state of the hand and fingers of the user, in which the step of controlling the hand object includes controlling a state of the hand object according to the state of the line of sight of the user. This program may be provided in a manner being stored in a non-transitory computer-readable information storage medium.

DESCRIPTION OF EMBODIMENT

One preferred embodiment of the present invention is described below in detail with reference to the accompanying drawings.

Figure 1:
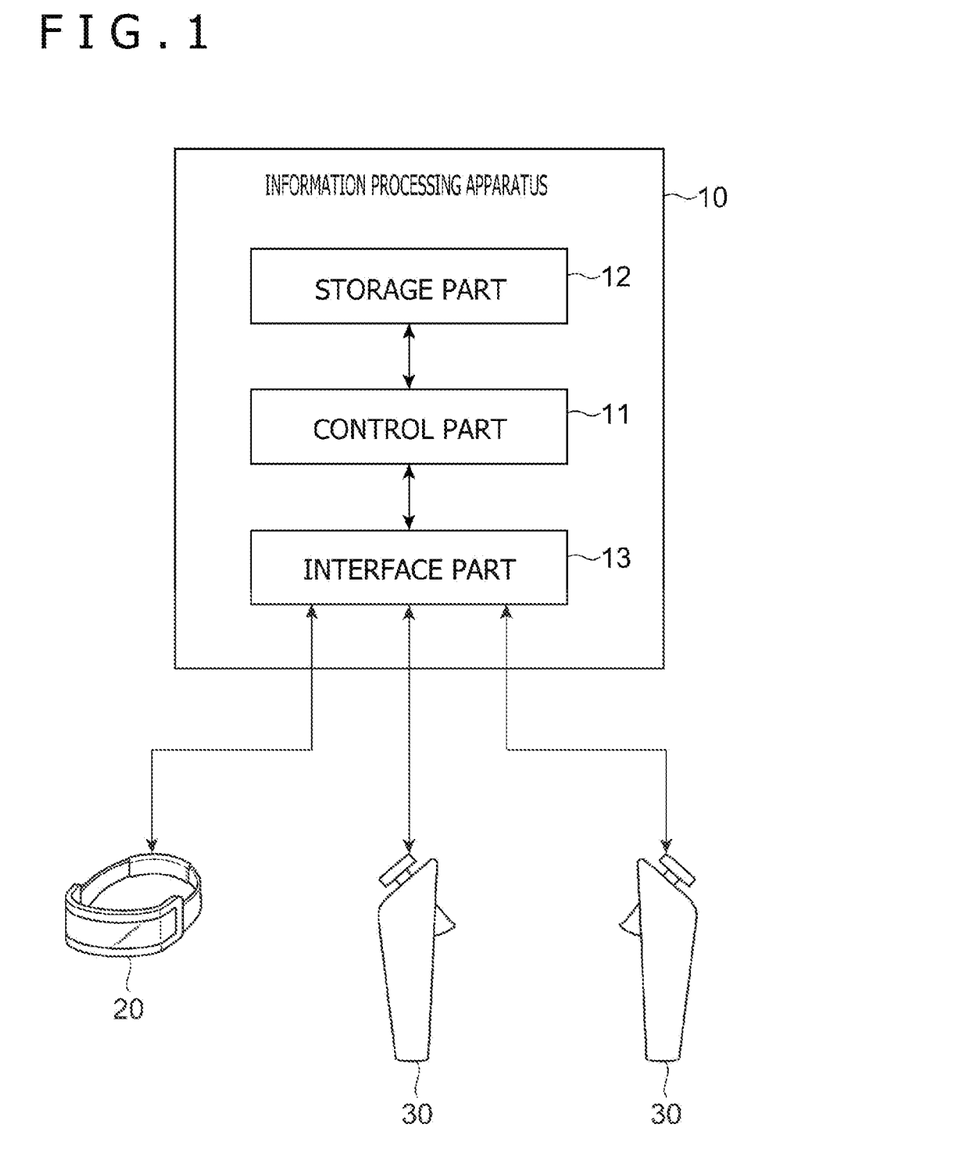
FIG. 1 is a configuration block diagram depicting a schematic configuration of an information processing apparatus embodying the present invention.

An information processing apparatus 10 embodying the present invention may be a home-use game machine or a personal computer, for example. As depicted in FIG. 1, the information processing apparatus 10 includes a control part 11, a storage part 12, and an interface part 13. Also, the information processing apparatus 10 is connected to a head-mounted display apparatus 20 and two operation devices 30 in a state in which data communication is enabled.

The control part 11 includes at least one processor such as a CPU that performs various information processes by executing programs stored in the storage part 12. Specific examples of the processing performed by the control part 11 of this embodiment will be discussed later. The storage part 12 includes at least one memory device such as a RAM that stores the programs to be executed by the control part 11 and the data to be processed by the programs.

The interface part 13 is an interface for data communication with the head-mounted display apparatus 20 and the operation devices 30. By way of the interface part 13, the information processing apparatus 10 is connected in a wired or wireless manner with each of the head-mounted display apparatus 20 and two operation devices 30. Specifically, the interface part 13 includes a multimedia interface such as HDMI (registered trademark) that transmits video data fed from the information processing apparatus 10 to the head-mounted display apparatus 20. The interface part 13 also includes a data communication interface such as Bluetooth (registered trademark) that receives signals representing the results of detection by the operation devices 30.

Figure 2:
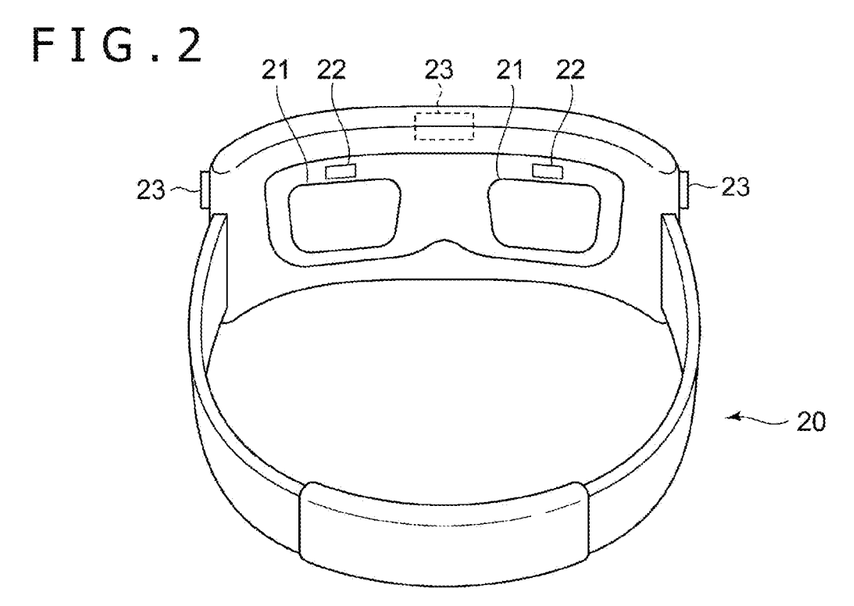
FIG. 2 is a schematic view illustrating an exemplary appearance of a head-mounted display apparatus.

The head-mounted display apparatus 20 is a display apparatus worn by the user on the head. As depicted in FIG. 2, the head-mounted display apparatus 20 includes display parts 21, internal cameras 22, and external cameras 23.

The display parts 21 are arranged in positions facing both eyes of the user wearing the head-mounted display apparatus 20. The display parts 21 display images corresponding to the video signals sent from the information processing apparatus 10, allowing the user to view the displayed images. The internal cameras 22 are also placed at such a position and a direction as to be capable of capturing images of the user's eyes in order to face the left and right eyes of the user. By analyzing the captured images from the internal cameras 22, the information processing apparatus 10 can identify a gaze direction of the user, i.e., the direction of the user's line of sight.

A surface of the head-mounted display apparatus 20 is equipped with multiple external cameras 23 for capturing images of surroundings. By analyzing the captured images from these external cameras 23, the information processing apparatus 10 identifies changes in the position and direction of the head-mounted display apparatus 20 in a real space. The changes in the position and direction of the head-mounted display apparatus 20 represent changes in the position and direction of the user's face. Known SLAM (Simultaneous Localization and Mapping) techniques may be used to identify the position and direction of the head-mounted display apparatus 20.

In this embodiment, the captured images from the external cameras 23 are also used to identify the positions of the operation devices 30. By identifying the positions of the operation devices 30 in the captured images, the information processing apparatus 10 can identify the positions of the operation devices 30 in the real space in reference to the position of the head-mounted display apparatus 20.

Figure 3:
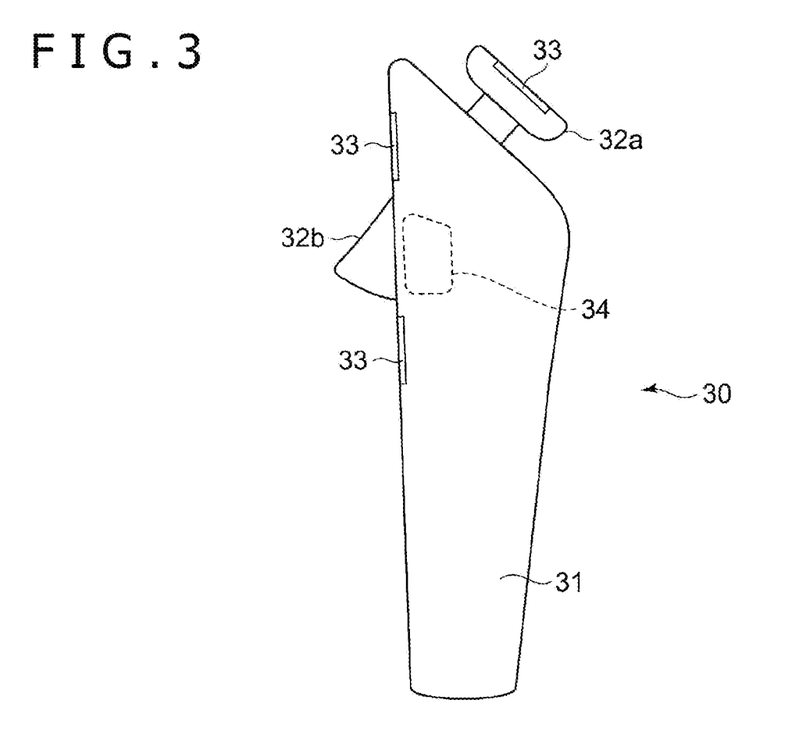
FIG. 3 is a schematic view illustrating an exemplary appearance of an operation device.

The operation device 30 is a device that receives input operations from the user and is held by the user's hand for use. In this embodiment, two operation devices 30 are connected with the information processing apparatus 10 and are held individually by the user's both hands. As depicted in FIG. 3, each operation device 30 includes a grip part 31, multiple operating members 32, multiple finger position sensors 33, and a force presentation mechanism 34.

The user holds each operation device 30 by gripping its grip part 31 with the ring finger and the little finger. Consequently, while using the operation devices 30, the user cannot perform the motion of closing and opening the ring finger and the little finger. The state of the ring finger and the little finger remain unchanged.

A surface of each operation device 30 has multiple operating members 32 placed thereon. Particularly in this embodiment, a tilt operation member 32a is placed in a thumb-operable position and is tilted to give directional instructions. Also, an operation button 32b is placed in a position operable by the index finger, the operation button 32b being capable of detecting a pushed-in amount.

The finger position sensors 33 are sensor devices that detect the positions of corresponding fingers. In this embodiment, multiple distance sensors are provided on the surface of the operation device 30 as the finger position sensors 33 that each detect the positions of three fingers such as the thumb, the index finger, and the middle finger.

The force presentation mechanism 34 presents force to the user's fingers. In this embodiment, the force presentation mechanism 34 is assumed to be capable of presenting force to the index finger of the user manipulating the operation button 32b.

Using the results of detection by the finger position sensors 33, the information processing apparatus 10 identifies the states of the thumb, the index finger, and the middle finger of each of the user's right and left hands. The state of each finger of the user here is assumed to represent whether the finger of the user is extended or bent relative to the palm of the hand or how much the finger is bent. By use of the results of detection by the finger position sensors 33 corresponding to each of the fingers, the information processing apparatus 10 identifies how much each finger is bent.

Figure 4:
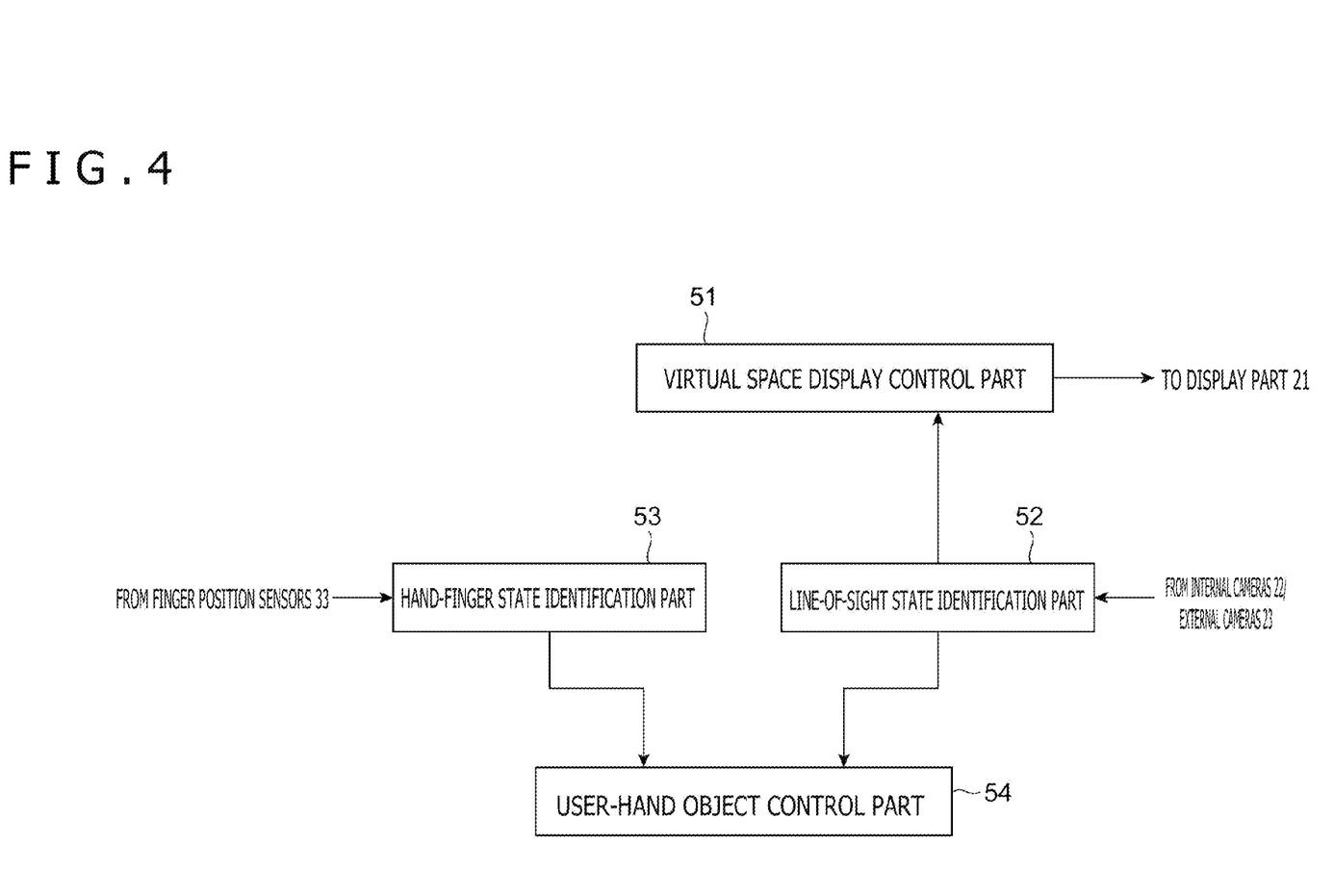
FIG. 4 is a functional block diagram depicting the functions implemented by the information processing apparatus embodying the present invention.

Explained below with reference to the functional block diagram of FIG. 4 are the functions implemented by the information processing apparatus 10 of this embodiment. As depicted in FIG. 4, the information processing apparatus 10 functionally includes a virtual space display control part 51, a line-of-sight state identification part 52, a hand-finger state identification part 53, and a user-hand object control part 54. These functions are implemented by the control part 11 executing a relevant program stored in the storage part 12. The information processing apparatus 10 may be supplied with such a program that may be provided via a communication network such as the Internet or may be provided in a manner being stored in an information storage medium such as an optical disk.

The virtual space display control part 51 creates a three-dimensional virtual space and presents how things look like in the created three-dimensional virtual space to the user. Specifically, the virtual space display control part 51 creates a virtual space in which various objects are placed. The virtual space display control part 51 then renders a spatial image depicting how things look like in the virtual space as viewed from a viewpoint camera P set therein, causing the display parts 21 of the head-mounted display apparatus 20 to display the spatial image thus rendered. At this point, the virtual space display control part 51 changes the position and direction of the viewpoint camera P in real time which serves as a reference in rendering the spatial image in a manner reflecting the changes in the position and direction of the head-mounted display apparatus 20. Accordingly, the user can look around in the virtual space by moving the head and can experience movement in the virtual space by walking around in the real space, as if he/she were in the virtual space.

Also in this embodiment, the virtual space display control part 51 places user-hand objects UH representing the user's hands in the virtual space. In this embodiment, it is assumed that two user-hand objects UHR and UHL corresponding to the user's right and left hands are placed. These user-hand objects UH each look like a human hand and, particularly in this embodiment, each have five fingers that can be controlled independently.

Figure 5:
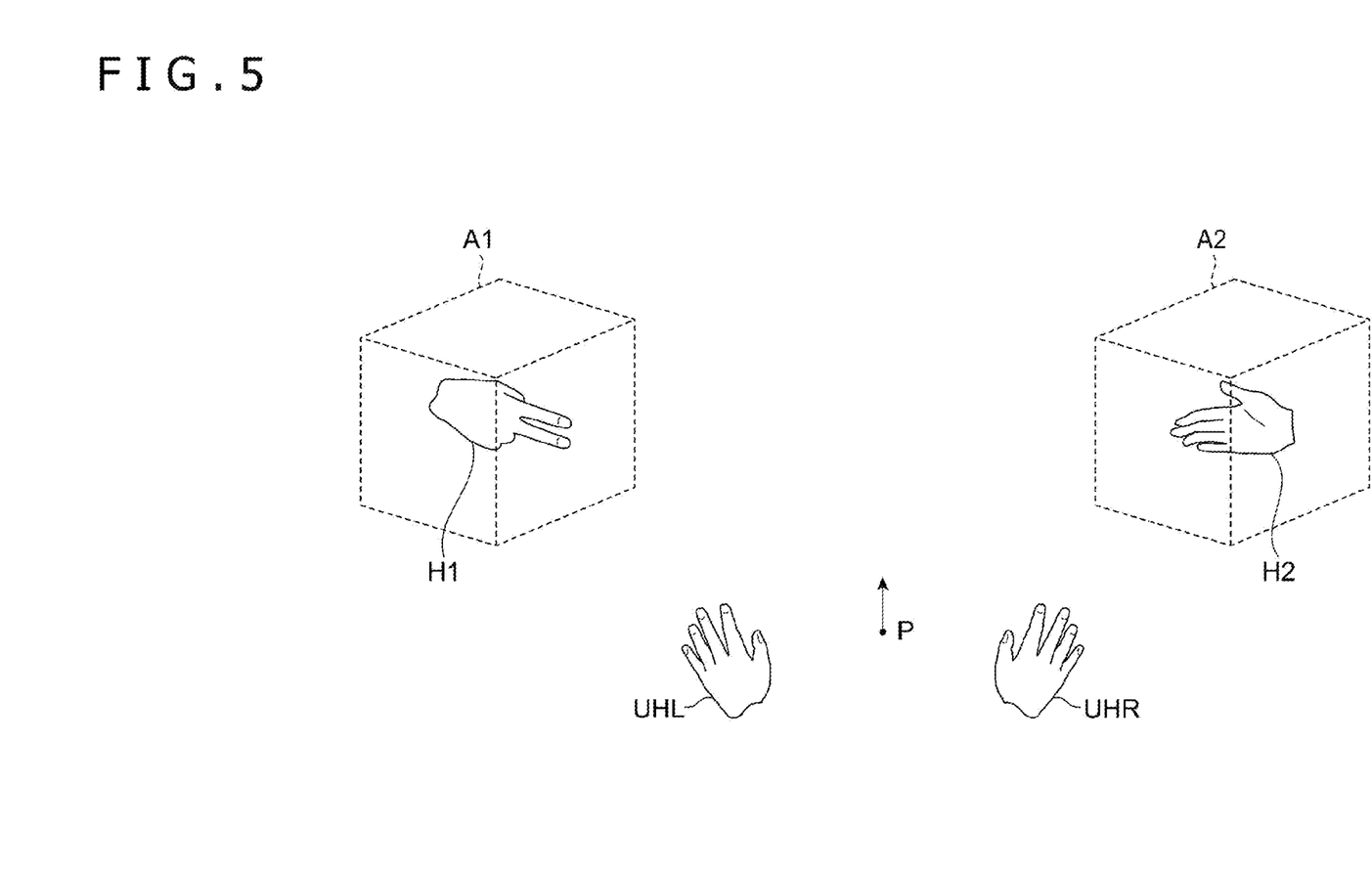
FIG. 5 is a schematic view depicting an example of how things look like in a virtual space.

Also, the virtual space display control part 51 places in the virtual space objects that can interact with the user-hand objects UH. FIG. 5 depicts an example of how things look like in the virtual space. FIG. 5 indicates another hand object H1 that can play rock-paper-scissors with the user-hand object UH and a hand object H2 that can shake hands with the user-hand object UH, the two objects being placed in the virtual space. Whereas only the hand objects are illustrated here, these objects may be portions of an avatar that is present in the virtual space. Also, in addition to these objects, various other objects that can interact with the user via the user-hand objects UH may be placed in the virtual space.

The line-of-sight state identification part 52 identifies the state of the user's line of sight. Specifically, as explained above, the line-of-sight state identification part 52 analyzes the captured images from the external cameras 23 in order to identify the position and direction of the head-mounted display apparatus 20. The position and direction of the head-mounted display apparatus 20 correspond to the position and direction of the user's face in the real space, representing the position and direction of a viewpoint that serves as the starting point of the user's line of sight. The line-of-sight state identification part 52 changes the position and direction of the viewpoint camera P in the virtual space in a manner linked with the position and direction of the user's viewpoint.

Further in this embodiment, it is assumed that the line-of-sight state identification part 52 identifies the gaze direction of the user as part of the line-of-sight state. While using the head-mounted display apparatus 20, the user can move solely the line of sight from side to side and up and down without changing the direction of the face. These line-of-sight movements do not involve changes in the position and direction of the head-mounted display apparatus 20. This makes it difficult to identify the line-of-sight direction only by analyzing the captured images from the external cameras 23. In view of this, the line-of-sight state identification part 52 analyzes the user's eyes in the captured images from the internal cameras 22 in order to identify the light-of-sight direction (gaze direction) of the user according to changes in the positions of the user's pupils, for example.

Although not reflected in the position and direction of the viewpoint camera P, the result of identification of the gaze direction is used to identify what is drawing the user's attention in the virtual space. Specifically, the line-of-sight state identification part 52 determines whether or not a given object placed in the virtual space is drawing the user's attention by use of the result of identification of the gaze direction. In the description that follows, the object serving as a target of the determination of whether or not it is drawing the user's attention will be referred to as an attention-drawing candidate object. The attention-drawing candidate object may be an object that can interact with the user via the user-hand objects UH.

If there is in the virtual space an attention-drawing candidate object in a direction in which the user's gaze direction is directed in reference to the position and direction of the viewpoint camera P, then the line-of-sight state identification part 52 determines that the user is paying attention to that attention-drawing candidate object. Alternatively, in another case where a given spatial region including the attention-drawing candidate object is in the gaze direction, the line-of-sight state identification part 52 may determine that the user is paying attention to the attention-drawing candidate object in that spatial region. In the following description, the attention-drawing candidate object determined to be attracting the user's attention will be referred to as an attention target object.

Specifically, in the above-described example of FIG. 5, the hand objects H1 and H2 are assumed to be the attention-drawing candidate objects. In the example of FIG. 5, the viewpoint camera P is directed in a direction toward a position between the hand objects H1 and H2. In this state, if the user turns the line of sight to the left and a spatial region A1 that includes the hand object H1 is in a direction in which the line of sight extends, the line-of-sight state identification part 52 identifies the hand object H1 as the attention target object. Even with the position and direction of the viewpoint camera P remaining unchanged, if the user turns the line of sight to the right direction and a straight line extending along the gaze direction passes through a spatial region A2 that includes the hand object H2, the line-of-sight state identification part 52 identifies the hand object H2 as the attention target object. What is set here as the spatial region A1 or A2 is a cube-shaped region of predetermined dimensions centering on each corresponding hand object. In the case where the user's line of sight is not directed at any of the attention-drawing candidate objects, the line-of-sight state identification part 52 determines that the user is not paying attention to any of the attention-drawing candidate objects.

The hand-finger state identification part 53 identifies the state of the user's hands and fingers in the real space. In this embodiment, as described above, the state of the fingers represents how much each finger of the user is bent. Here, the hand-finger state identification part 53 identifies in real time the state of a total of six fingers, i.e., the user's thumb, index finger, and middle finger of each of both hands, using the results of detection by the multiple finger position sensors 33 provided on the left and right operation devices 30.

The user-hand object control part 54 controls the state of the user hand objects UH placed in the virtual space. First, the user-hand object control part 54 changes the positions of the user hand objects UH in a manner linked with the positions of the user's both hands identified by the hand-finger state identification part 53. More specifically, the user-hand object control part 54 decides the positions of the user hand objects UH in the virtual space in reference to the position and direction of the viewpoint camera P, in a manner corresponding to the positions of the operation devices 30 in the real space in reference to the position and direction of the head-mounted display apparatus 20.

Further, the user-hand object control part 54 controls the state of the user hand objects UHR and UHL on the basis of the results of identification of the state of the user's each finger of both hands by the hand-finger state identification part 53. Specifically, the user hand objects UHR and UHL have five fingers each. With regard to the fingers set as a target of identification of the state by the hand-finger state identification part 53, the corresponding fingers of the user hand objects UHR and UHL are moved in a manner linked with the user's real fingers. For example, in the case where the user bends the right-hand thumb, the user-hand object control part 54 performs control to bend the corresponding thumb of the user hand object UHR. Note that the user-hand object control part 54 does not change the state of the fingers not being set as the target of identification by the hand-finger state identification part 53, while controls based on the line-of-sight state to be discussed later are not being carried out.

Further in this embodiment, the user-hand object control part 54 controls the state of the user hand objects UH according to information regarding the user's line-of-sight state identified by the line-of-sight state identification part 52. Information regarding the position and direction of the user's face or the user's gaze direction in the real space may be used unmodified as the information regarding the line-of-sight state. Alternatively, the information regarding the attention target object identified in the virtual space on the basis of the above information may be used instead.

Explained below are examples in which the information regarding the attention target object attracting the user's attention is used as the information regarding the user's line-of-sight state. In the case where the attention-drawing candidate object is an object that interacts with the user hand objects UH by a predetermined method and where that attention-drawing candidate object is identified as the attention target object, the user-hand object control part 54 controls the state of the user hand objects UH in a predetermined manner corresponding to that attention target object. This can put the user hand objects UH into a state fit for interaction with the attention target object. The user hand object UH serving as a target of control by the user-hand object control part 54 may be either a predetermined one of the user hand objects UH, of the user hand objects UHR and UHL, with respect to the attention target object, or both of the user hand objects UH. Alternatively, in the virtual space, either of the user hand objects UH determined by given criteria, such as being the closer one of the two to the attention target object, may be selected as the control target.

The user-hand object control part 54 performs control in such a manner that the state of the user-hand object UH as the control target will meet the constraints predetermined for the target of attention. Explained below are specific examples of the control performed on the user-hand object UH.

First, a first example is an example in which the user-hand object UH as the control target is turned into one of multiple predetermined states. In the above-described example in which the attention target object is the hand object H1, the user is assumed to play rock-paper-scissors with the hand object H1. In this case, the user-hand object control part 54 is to turn the user-hand object UH as the control target into one of the three states of rock, paper, and scissors. Any other state (e.g., in which three fingers are extended and two fingers are bent) is considered to be different from the user's intention.

The user-hand object control part 54 then estimates which one of the multiple states (of rock, paper, and scissors) is intended by the user on the basis of the state of the user's fingers set as the target of identification. According to the result of the estimation, the state of the fingers not being set as the target of identification is controlled. For example, in the case where the thumb, the index finger, and the middle finger set as the target of identification are all extended as depicted in Subfigure (a) of FIG. 6, it is estimated that the user is about to play paper. In this case, as illustrated in Subfigure (b) of FIG. 6, the user-hand object control part 54 changes the fingers of the user-hand object UH corresponding to the three fingers set as the target of identification into a state where the three corresponding fingers are extended and where the ring finger and the little finger which are not being set as the target of identification are also extended. In this manner, although the user's hand does not take the shape of paper in the real space, the user-hand object UH in the virtual space is changed into the shape of paper. The user can thus play rock, paper, and scissors with the hand-object H1 without feeling awkward.

Figure 6:
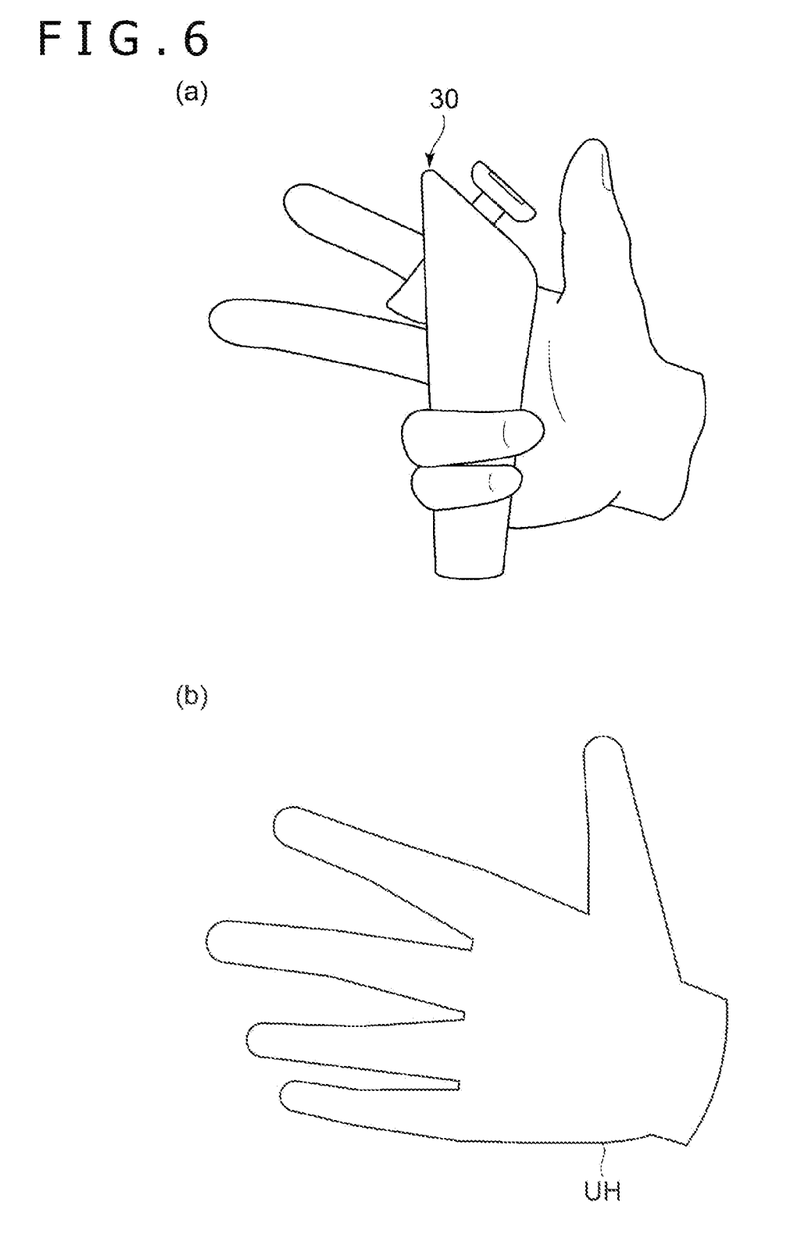
FIG. 6 is a set of schematic views depicting an example of how a user-hand object is controlled to reflect the state of user's real fingers.

In this example, the user-hand object control part 54 may also change the fingers set as the target of identification into any one of the predetermined states. For example, in the case where the thumb, the index finger, and the middle finger are all somewhat opened and where it is estimated that the user is about to play paper, the user-hand object control part 54 may change these fingers into the state where they are fully opened.

The user-hand object control part 54 performs the above-described control on the user-hand object UH in real time while presenting the user with an image of how things look like in the virtual space. That is, the line-of-sight state identification part 52 continuously monitors the state of the user's line of sight. In the case where it is determined that the user's line of sight is directed at the attention target object, the user-hand object control part 54 immediately starts performing control to turn the user-hand object UH into a given state. In the case where the user who has been gazing at the attention target object so far, now turns the line of sight to another place, the user-hand object control part 54 returns control of the user-hand object UH back to ordinary control (i.e., the control whereby the state of the identified fingers is reflected unmodified).

With the above-described control, the user-hand object control part 54 can get the user-hand object UH to play rock, paper, and scissors only while the user is gazing at the hand object H1. Conversely, even if the user-hand object UH happens to move close to the hand object H1, unless the user directs the line of sight at the hand object H1, it is determined that the user has no intention of playing rock, paper, and scissors. The user-hand object control part 54 then does not forcibly change the state of the user-hand object UH into any one of the states of rock, paper, and scissors.

Next, a second example is an example in which the fingers not being as the target of dentification are changed in linkage with the fingers set as the target of identification. In the above-described example where the attention target object is the hand object H2, the user is assumed to shake hands with the hand object H2. In this case, given the user-hand object UH as the control target having moved close to the hand object H2, the user-hand object control part 54 performs control to bend the ring finger and the little finger of the user-hand object UH in linkage with the fingers set as the target of identification. Specifically, the user-hand object control part 54 may perform control to bend the ring finger and the little finger in a manner commensurate with the reference finger (e.g., the index finger or the middle finger). Consequently, when the user carries out a gesture of gripping the hand object H2 by bending the index finger and middle finger, the ring finger and little finger are also moved in a manner gripping the hand object H2. As a result, the user-hand object UH is moved to shake hands with the hand object H2.

Note that, in this example, the user-hand object UH serving as the target of control may be moved to a position in the virtual space where it can shake hands with the hand object H2 regardless of the position of the hand in the real space.

Also in this example, when making the gesture of handshake, the user pushes in the operation button 32*b* with the index finger. In response to the push, the user-hand object control part 54 may activate the force presentation mechanism 34 of the operation device 20 to present the user's finger with force. This allows the user to experience a feeling as if the user were actually gripping the hand object H2.

In addition, whereas the user-hand object UH is caused to grip the hand object H2 as the target of handshake here, the user-hand object control part 54 may perform control of gripping diverse kinds of objects, including a ball, with the five fingers of the user-hand object UH, according to a similar control. Also in this example, if the user-hand object UH performs the action of throwing the object gripped, the user-hand object control part 54 may perform control in which the object is flying through the virtual space. In this case, the direction in which the thrown object is flying may be controlled in keeping with the user's gaze direction. That is, the user-hand object control part 54 may perform control in which the object such as the ball will fly in the direction of the user's line of sight. Under such control, not only the user-hand object UH but also an object interacting therewith may be controlled to behave in a manner better reflecting the user's intention on the basis of the state of the user's line of sight.

As explained above, the information processing apparatus 10 of this embodiment can turn the user-hand object UH into a state better reflecting the user's intention by controlling the state of the user-hand object UH according to the state of the user's line of sight, for example, through determination of which object is drawing the user's attention.

Note that the embodiment of the present invention is not limited to what has been described above. For example, whereas it has been explained that the attention target object drawing the user's attention is identified and that the manner of controlling the user-hand object UH is changed according to the identified attention target object, this is not limitative of the present invention. Alternatively, the manner of controlling the user-hand object UH may be varied depending on the spatial region at which the user's line of sight is directed or in keeping with the position of the user's viewpoint.

It has also been explained that the user holds the operation devices 30 with both hands and that the user-hand object control part 54 sets the two user-hand objects UH corresponding to the two hands as control targets. However, this is not limitative of the present invention. Alternatively, the user-hand object control part 54 may set only one user-hand object UH corresponding to either of the hands as a control target according to the line-of-sight state.

In addition, the above-described methods of identifying the state of the user's line of sight and the state of the user's hands and fingers are only examples. Alternatively, the information processing apparatus 10 according to the present embodiment may identify the state of the user's line of sight and the state of the user's hands and fingers by using diverse kinds of information. For example, the information processing apparatus 10 may identify the state of the user's fingers by using the results of detection not only by the distance measuring sensors but also by other types of sensors mounted on the operation devices 30. In the case where a given operation button is pushed in, the information processing apparatus 10 may determine that the finger assumed to operate that operation button is being bent. Further, the information processing apparatus 10 may identify how strong the grip of the hand is depending on the pushed-in amount of the operation button.

Also, although it has been explained that the user holds the operation devices 30 with some of his or her fingers (the ring finger and the little finger), this is not limitative of the present invention. Alternatively, a device for detecting the state of each finger may be attached to the palm of the user's hands or to the tip of each of the user's fingers. As another alternative, the information processing apparatus 10 may identify the state of the user's fingers by capturing their images from the outside with a camera. This method allows the user to move all five fingers as desired. In such cases as well, the state of some fingers may not be correctly recognized due to hardware constraints or issues with the accuracy of detection. Even in such cases, as explained above, the state of the fingers of the user-hand object UH can be controlled in keeping with the state of the user's line of sight to move the user-hand object UH in a manner reflecting the user's intention.

REFERENCE SIGNS LIST

1: Information processing apparatus
11: Control part
12: Storage part
13: Interface part
20: Head-mounted display apparatus
21: Display part
22: Internal camera
22: External camera
30: Operation device
31: Grip part
32: Operating member
33: Finger position sensor
34: Force presentation mechanism
51: Virtual space display control part
52: Line-of-sight state identification part
53: Hand-finger state identification part
54: User-hand object control part

The invention claimed is:

1. An information processing apparatus comprising:
circuitry configured to:
identifying a state of a line of sight of a user;
identifying a state of a hand and fingers of the user, and setting some of the fingers of the user as a target of identification; and
controlling a hand object representing the hand of the user in a virtual space, in a manner linked with the state of the hand and fingers of the user,
wherein controlling the hand object comprises controlling (i) a state of the hand object according to the state of the line of sight of the user, and (ii) a state of a finger not being set as the target of identification from among fingers belonging to the hand object, according to the state of the line of sight of the user and the state of the finger of the user set as the target of identification.

2. The information processing apparatus according to claim 1, wherein,
on a basis of a gaze direction of the user, identifying, as the state of the line of sight of the user, an object that draws an attention of the user from among objects placed in the virtual space, and
controlling the hand object comprises controlling the state of the hand object in a manner determined in keeping with the object that draws the attention of the user.

3. The information processing apparatus according to claim 2, wherein, in a case where a given object is drawing the attention of the user, controlling to turn the state of the hand object into one of a plurality of predetermined states in keeping with the state of the hand and fingers of the user.

4. The information processing apparatus according to claim 1, wherein controlling the hand object comprises controlling the finger not being set as the target of identification in a manner linked with the finger set as the target of identification.

5. An information processing method comprising:
identifying a state of a line of sight of a user;
identifying a state of a hand and fingers of the user and setting some of the fingers of the user as a target of identification; and
controlling a hand object representing the hand of the user in a virtual space, in a manner linked with the state of the hand and fingers of the user,
wherein the controlling the hand object includes controlling (i) a state of the hand object according to the state of the line of sight of the user, and (ii) a state of a finger not being set as the target of identification from among fingers belonging to the hand object, according to the state of the line of sight of the user and the state of the finger of the user set as the target of identification.

6. A non-transitory, computer readable storage medium containing a computer program, which when executed by a computer, causes the computer to perform an information processing method, comprising:
identifying a state of a line of sight of a user;
identifying a state of a hand and fingers of the user and setting some of the fingers of the user as a target of identification; and controlling a hand object representing the hand of the user in a virtual space, in a manner linked with the state of the hand and fingers of the user, wherein the controlling the hand object includes controlling (i) a state of the hand object according to the state of the line of sight of the user, and (ii) a state of a finger not being set as the target of identification from among fingers belonging to the hand object, according to the state of the line of sight of the user and the state of the finger of the user set as the target of identification.

* * * * *